United States Patent [19]

Ueno et al.

[11] Patent Number: 4,709,553
[45] Date of Patent: Dec. 1, 1987

[54] METHOD OF AND APPARATUS FOR CONTROLLING SUPERCHARGE PRESSURE FOR A TURBOCHARGER

[75] Inventors: Takashi Ueno, Yokosuka; Toshimi Abo, Yokohama, both of Japan

[73] Assignee: Nissan Motor Co., Ltd., Kanagawa, Japan

[21] Appl. No.: 771,406

[22] Filed: Aug. 30, 1985

[30] Foreign Application Priority Data

Sep. 5, 1984 [JP] Japan .................... 59-185633

[51] Int. Cl.⁴ ............................................ F02B 37/12
[52] U.S. Cl. .................................................... 60/602
[58] Field of Search .............. 60/600, 601, 602, 603, 60/611; 123/564

[56] References Cited

U.S. PATENT DOCUMENTS 4,467,607 8/1984 Rydquist et al. ............. 60/602

FOREIGN PATENT DOCUMENTS

| 40814 | 12/1981 | European Pat. Off. | ............. 60/602 |
| 46872 | 3/1982 | European Pat. Off. | ............. 60/600 |
| 0136541 | 4/1985 | European Pat. Off. | . |
| 58-180726 | 10/1983 | Japan . | |
| 59-39733 | 3/1984 | Japan . | |
| 60-56126 | 4/1985 | Japan . | |
| 60-56127 | 4/1985 | Japan . | |
| 60-56128 | 4/1985 | Japan . | |
| 2083135 | 3/1982 | United Kingdom | ............. 60/600 |
| 2105878 | 3/1983 | United Kingdom | ............. 60/600 |

Primary Examiner—Michael Koczo
Attorney, Agent, or Firm—Schwartz, Jeffery, Schwaab, Mack, Blumenthal & Evans

[57] ABSTRACT

A method of and an apparatus for controlling supercharge pressure in which a preset supercharge pressure is increased when an acceleration condition is determined or detected and the actual supercharge pressure can be feedback-controlled to a new target supercharge pressure in the acceleration condition through an electromagnetic valve and an actuator by a control signal from an electronic control unit including a microprocessor, in accordance with the detected parameters such as supercharge pressure, intake air flow rate. Any control errors brought about by variations in parts, such as diaphragm variations and variations during assembly of the exhaust bypass valve, as well as changes in engine performance with time, can be eliminated.

7 Claims, 6 Drawing Figures

METHOD OF AND APPARATUS FOR CONTROLLING SUPERCHARGE PRESSURE FOR A TURBOCHARGER

BACKGROUND OF THE INVENTION (1) Field of the Invention

The present invention relates to a method of and an apparatus for controlling supercharge pressure for a turbocharger.

(2) Description of the Prior Art

A turbocharger is constructed in such a manner that an exhaust turbine is rotated by exhaust gas at high temperature and high pressure so that the pressure within an engine intake manifold connected to the outlet of the turbocharger increases above atmospheric pressure as the number of rotations of a compressor in the turbocharger increases. As a result, the supply of a large quantity of intake air to the engine becomes possible by the supercharge pressure thus obtained, with the result that high engine torque, and high engine output can be obtained and an improvement of the engine fuel consumption can be obtained as well.

On the other hand, however, in the high load operating zone, the turbine speed becomes too high to control the supercharge pressure. Accordingly, provision is normally made for an exhaust bypass valve downstream of the turbine so as to discharge the pressure at the turbine inlet and to prevent the supercharge pressure from exceeding an allowable maximum pressure.

The control of the supercharge pressure by the exhaust bypass valve is as follows; a diaphragm actuator is provided so as to drive the exhaust bypass valve, with the supercharge pressure produced downstream of the compressor being the operating pressure, and the supercharge pressure is maintained at a preset supercharge pressure, i.e., it is maintained constant by controlling the duty value of an electromagnetic valve which discharges the operating pressure to the atmosphere. For instance, when the actual supercharge pressure exceeds a preset supercharge pressure, the pressure exerted on a diaphragm for reducing the duty valve of the electromagnetic valve increases. As a result, a rod coupled to the diaphragm is moved against a spring thereof by the diaphragm and the movement of the rod permits the exhaust bypass valve to operate in the direction of its opening through a likage mechanism. An increase in the proportion of opening the valve enables the exhaust gas amount bypassing the turbine to increase, thereby lowering the engine speed and this in turn reduces the supercharge pressure to the preset supercharge pressure.

Since a large engine output is required when accelerating, the actual supercharge pressure is sometimes increased provisionally above the preset supercharge pressure during normal operation. Normally, when an acceleration condition is detected, a control unit increases the duty value of the electromagnetic valve and the operation pressure acting on the diaphragm is discharged, so as to reduce the pressure exerted on the diaphragm. As a result, the opening of the exhaust bypass valve is delayed, thus increasing the supercharge pressure due to the increased exhaust gas flow to the turbine (See Japanese Patent Disclosure Specification No. 58-180726/1983).

In a turbocharger in which acceleration correction is carried out according to the prior art as described above, the duty value of the electromagnetic valve is increased by predetermined amounts and there is a possibility that the supercharge pressure sometimes deviates from the optimum value due to a variation in the elastic force of the springs of the diaphragm or due to a change in the engine performance with the elapse of time. This causes a condition where the supercharge pressure is excessively low and a desirable acceleration cannot be obtained, while, when the supercharge pressure is excessively high, it will bring about engine knocking.

SUMMARY OF THE INVENTION

It is an object of the present invention to provide a method of and an apparatus for controlling supercharge pressure in which a preset target supercharge pressure is set up and the preset supercharge pressure is feedback controlled in accordance with the result of the comparison of the actual supercharge pressure detected with the preset supercharge pressure so as to cancel at the time of acceleration control errors due to variations in the parts used.

It is another object of the present invention to provide a method of and an apparatus for controlling supercharge pressure for a turbocharger in which the response to the supercharge pressure is improved at the initial acceleration.

It is still another object of the present invention to provide a method of and an apparatus for controlling supercharge pressure for a turbocharger in which a preset supercharge pressure is increased by determining an acceleration condition of a car and feedback controlling the actual supercharge pressure to be equal to the target supercharge pressure during acceleration. In this manner, any control errors brought about by the variations in the parts or a change in the engine characteristics with time may be cancelled.

It is a further object of the present invention to provide a method of and an apparatus for controlling supercharge pressure in which good acceleration performance is obtained and engine knocking is prevented from occurring.

According to one feature of the present invention, the method of controlling supercharge pressure for a turbocharger is characterized in that it comprises the steps of: seeking a basic control amount from a look-up table in accordance with intake air flow rate; determining if an acceleration condition is occurring; calculating a basic control amount during acceleration by adding an acceleration increment to the basic control amount and calculating a target supercharge pressure during acceleration by adding an acceleration increment of supercharge pressure to a preset supercharge pressure; determining if actual supercharge pressure detected is equal to or larger than a predetermined value; calculating the deviation between the target supercharge pressure during acceleration and the actual supercharge pressure and further calculating a correction amount to be fed back; seeking a final duty value for an electromagnetic valve by the addition of the correction amount to the basic control amount during acceleration; and producing a control signal having the duty value for the electromagnetic valve.

According to another feature of the present invention, the apparatus for controlling supercharge pressure for a turbocharger is characterized in that it comprises: a plurality of detecting means for detecting operating conditions of the engine, such as air flow rate, supercharge pressure, throttle valve opening; an exhaust bypass valve provided at an exhaust manifold and having coupling means coupled to an actuator; an electromagnetic valve provided at a liason pipe for controlling the actuator in accordance with a control signal; and an electronic control unit having a microprocessor including a CPU, a ROM, and a RAM, an A/D converter, and an input/output interface for producing the control signal and for controlling the electromagnetic valve in accordance with the parameter of the operating conditions of the engine, detected by the plurality of detecting means, data corresponding to the steps of the method according to the present invention has preliminarily been stored in the ROM.

These and other objects, features and advantages of the present invention will be better understood from a detailed description of the preferred embodiments with reference to the following drawings.

DETAILED DESCRIPTION OF PREFERRED EMBODIMENT

Figure 1:
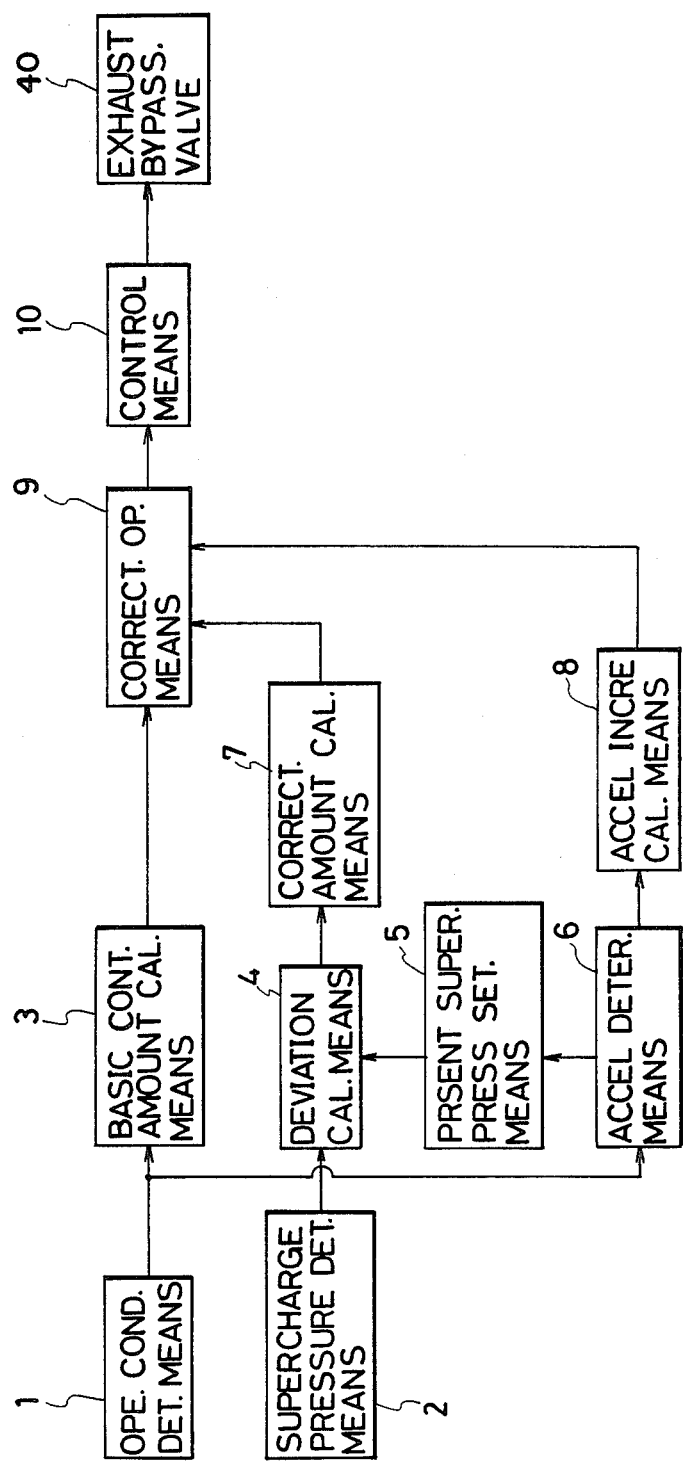
FIG. 1 illustrates a basic construction of the apparatus for controlling supercharge pressure for a turbocharger, according to the present invention.

Referring to FIG. 1, a basic conception of the construction of the apparatus according to the present invention is shown. The apparatus comprises operating condition detecting means 1 for detecting the operating conditions of an engine, supercharge pressure detecting means 2 for detecting the actual supercharge pressure, which is pressurized by a compressor, basic control amount calculation means 3, deviation calculation means 4, setting means 5 for setting a preset or target supercharge pressure, acceleration determining means 6, correction amount calculating means 7, acceleration increment calculating means 8, correction operational means 9, control means 10, and exhaust bypass valve means 11 controlled by the control means.

The operating condition detecting means 1 detects, for instance, intake air flow rate as one parameter representative of the operating conditions of the engine. The basic control amount calculation means 3 calculates a basic control amount for controlling the control means in accordance with parameters detected. The deviation calculating means 4 calculates the deviation between the actual supercharge pressure detected and a target supercharge pressure which is set up at the time of acceleration. The target or preset supercharge pressure setting means 5 sets up the target supercharge pressure which is higher than a normal target supercharge pressure at the time of the acceleration.

The acceleration determining means 6 detects or determines an acceleration condition from the parameters detected by the operating condition detecting means 1. The correction amount calculating means 7 calculates a correction amount to be fed-back from the deviation calculation by the deviation calculating means 4. The acceleration increment calculating means calculates each acceleration increment at the time of acceleration relating to the control amount calculated. The correction operational means 9 corrects the basic control amount in accordance with the acceleration increment, that is, adds the acceleration increment to the basic control amount. The control means 10 controls the degree of opening of the exhaust bypass valve 11 through an actuator (not shown), in accordance with the corrected control amount from the correction operational means 9.

With this construction, since the target supercharge pressure at the time of acceleration, which has been increased so as to increase the engine output is feedback controlled, any deviation of the actual supercharge pressure from the target supercharge pressure at the time of acceleration due to the dispersion of the parts can be cancelled, thereby constantly obtaining optimum supercharge pressure at the time of acceleration.

Figure 2:
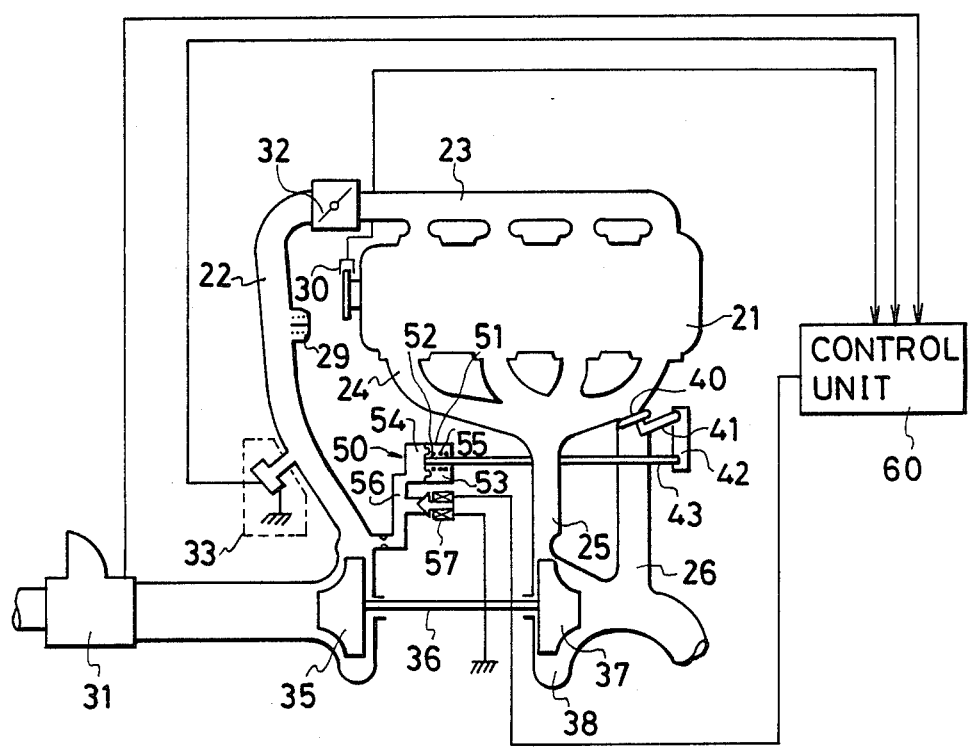
FIG. 2 illustrates an overall engine system having a turbocharger to which the method and the apparatus according to the present invention are applied.

FIG. 2 shows an overall engine system having a turbocharger to which the present invention is applied. In the system, air is supplied to an engine 21 through an inlet pipe 22 and an inlet manifold 23 and exhaust gas is discharged through an outlet manifold 24 and an exhaust pipe 25.

At the left end of the inlet pipe 22, there is provided an air flow meter 31 for measuring the inlet air flow rate Qa and at the bottom portion of the inlet pipe 22, there is provided a compressor 35 which constitutes part of the turbocharger, which supplies the intake air flow supplied through the air flow meter 31 to the engine 21 after pressurizing the air. At the end portion of the inlet pipe 22 adjacent to the inlet manifold 25, there is provided a throttle valve 32 while a pressure release valve 29 is provided between the compressor 35 and the throttle valve 32. A turbine chamber 38 is formed at the bottom of the exhaust pipe 25 and a turbine 37 is provided within the turbine chamber 38, which is linked with the compressor 35 by a link shaft 36.

An exhaust bypass valve 40 is provided at the junction between an exhaust bypass path 26 for bypassing the turbine 37 and the exhaust manifold 24. The exhaust bypass valve 40 is linked to one end of a rod 43 through an arm 41 and a linkage member 42, and the other end of the rod 43 is linked to a diaphragm 52 in an actuator 50 so as to drive the bypass valve 40. A casing 51 having the diaphragm 52 is divided into an atmospheric chamber 53 and a positive pressure chamber 54 by the diaphragm 52. The atmospheric chamber 53 is provided with a spring 55 which is urged so as to push the diaphragm 52 toward the positive pressure chamber 54. The positive pressure chamber 54 is communicated with the inlet pipe 22 at the downstream of the compressor 35 through a liaison pipe 56 and the supercharge pressure produced by the compressor 35 is supplied to the positive pressure chamber 54.

An electromagnetic valve 57 is provided at the liaison pipe 56 and when the electromagnetic valve 57 is opened by a control signal from an electric control unit 60, the liaison pipe 56 is communicated with the atmosphere through the electromagnetic valve 57, thus lowering the pressure within the positive pressure chamber 54. More specifically, the electromagnetic valve 57 is duty-controlled by the electronic control 60, so that the larger the duty value thereof, the greater the opening of the electromagnetic valve 57. As a result, the pressure in the positive pressure chamber 54 lowers and the diaphragm 52 is moved downward by the action of the spring 55 within the atmospheric chamber 53. This downward movement of the diaphragm 52 is transmitted to the exhaust bypass valve 40 through the rod 43, the linkage member 42, and the arm 41 and the valve 40 is operated in the direction of closing the bypass path 26.

On the other hand, the smaller the duty value becomes, the smaller opening of the electromagnetic valve 57 so that the pressure in the positive pressure chamber 54 increases. As a result, the diaphragm 72 is moved upward against the spring 55 and the upward movement of the diaphragm permits the exhaust bypass valve 40 to be operated in the direction of opening. The function of the valve 40 is to prevent the engine 21 from being damaged due to an excessive increase of the intake supercharge pressure supplied to the engine 21 when the exhaust gas from the engine 21 is discharged outside and a suitable supercharge pressure is introduced into the engine 21 by reducing the exhaust gas to be supplied to the turbine 37.

The electromagnetic control unit 60 comprises a microprocessor including a central processing unit (CPU), a random access memory (RAM), and a read only memory (ROM), an A/D converter, and an input/output interface (all are not shown). The detected signals from the air flow meter 31, the crank angle sensor 30, the throttle valve 32, and the supercharge pressure sensor 33 are applied to the control unit 60 and they are converted into digital data corresponding to the intake air flow rate Qa, the engine speed Ne, the throttle valve opening $\theta$, and the supercharge pressure P2 through the A/D converter in the control unit 60 in a well known manner.

The microprocessor, not shown, of the control unit 60 calculates each suitable duty value of the control signal to be applied to the electromagnetic valve 57 for driving the same, in accordance with the detected signals. As the result of controlling the electromagnetic valve 57, the amount of the exhaust gas to the turbine 37 is changed by the control of the exhaust bypass valve 40. By this action, the intake supercharge pressure to be supplied to the engine 21 is suitably controlled in response to the intake air flow rate Qa, thus increasing the torque from the low speed operating zone to the high speed operating zone.

Figure 3:
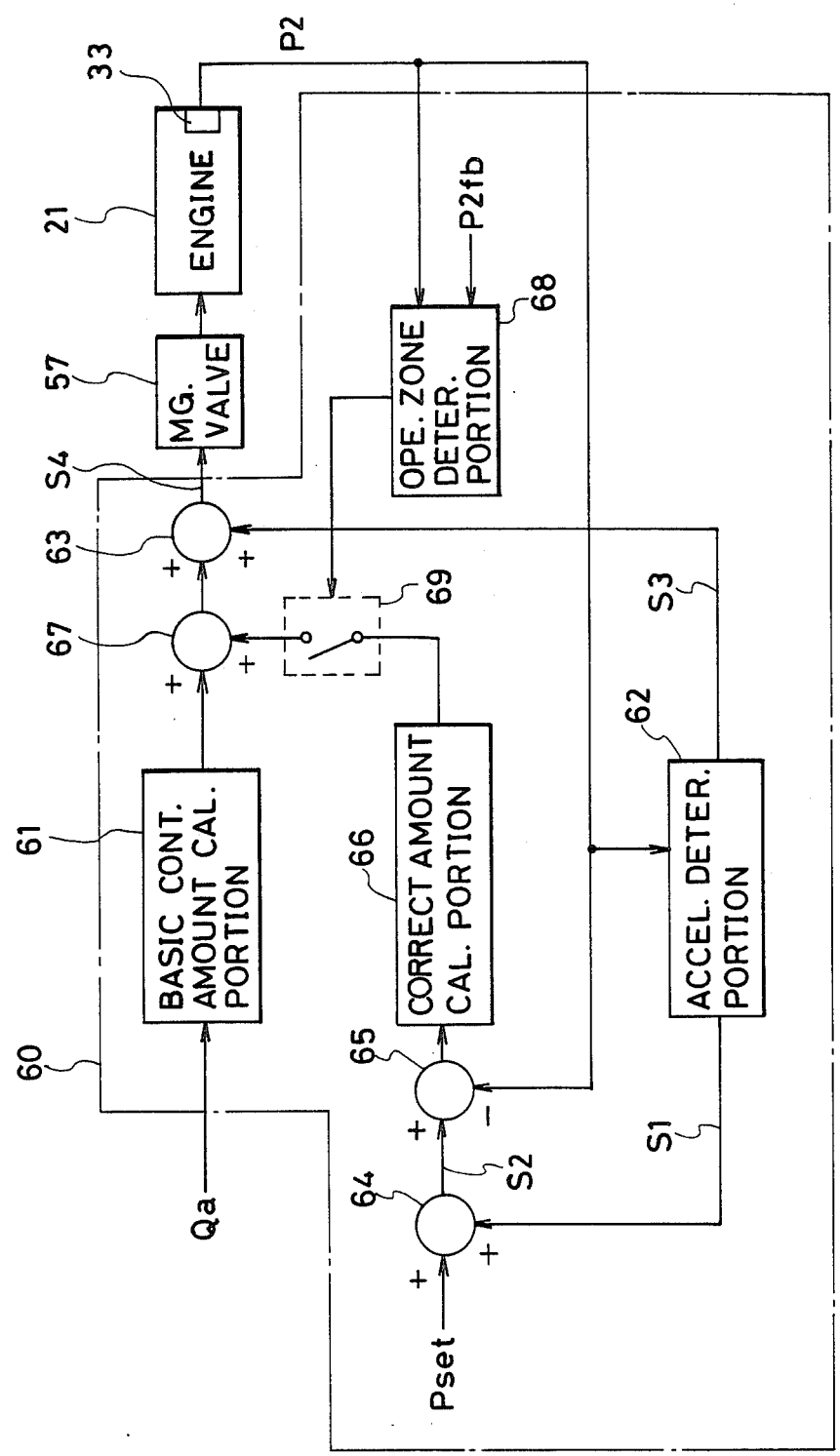
FIG. 3 illustrates an a functional construction of the electronic control unit and its associated constructing elements of FIG. 2.

FIG. 3 shows a functional construction of the control unit 60 shown in FIG. 2 and the associated control element and the engine 21. In the figure, basic control amount operational means 61 calculates a basic control amount BASE of the duty value for driving the electromagnetic valve 57 by carrying out a table look-up in accordance with the intake air flow rate Qa detected by the air flow meter 31 and inputted to the control unit 60 as one of the operation parameters.

The electromagnetic valve 57 is opened in accordance with the basic control amount BASE and the supercharge pressure is controlled toward a preset value of the target supercharge pressure, e.g., 375 mmHg through the actuator 50 (FIG. 2) and the exhaust bypass valve 57 (FIG. 2). More specifically, the duty value of the control signal for driving the electromagnetic valve 57 has been calculated in advance by experiment against the intake air flow rate Qa and the data thus obtained has been stored in the ROM of the microprocessor not shown. Then, suitable duty values necessary for each of the operating conditions of the engine 21 can be calculated by the table look-up operation, so as to keep track of the actual supercharge pressure to the preset supercharge pressure value.

Figure 4:
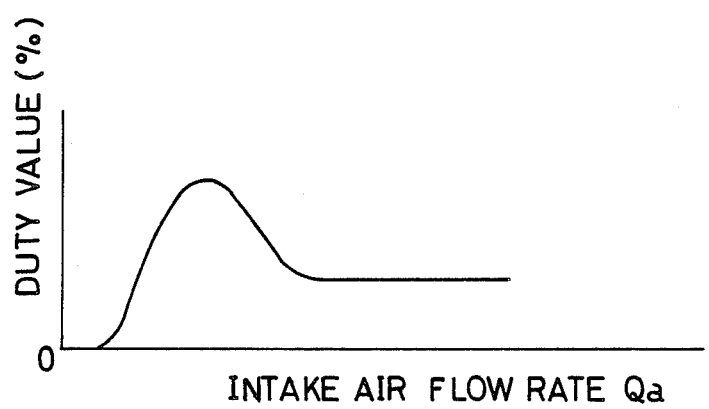
FIG. 4 illustrates the content of a look-up table relating to the duty value for controlling an electromagnetic valve vs. intake air flow rate.

FIG. 4 shows a look-up table of the duty value for use with the table look-up operation, in which the X-axis indicates intake air flow rate Qa and the Y-axis indicates each corresponding duty value.

Turning back to FIG. 3, acceleration determining portion 62 compares the differential of the actual supercharge pressure P2 detected by the supercharge pressure sensor 33 with a predetermined value of the supercharge pressure and determines the acceleration time point or the acceleration condition from a condition where the actual supercharge pressure exceeds the preset or the predetermined value of the supercharge pressure. When the acceleration time point is found in accordance with the result of the determination of the acceleration determining portion 62, a signal S3 including the acceleration increment X is produced and is applied to an adder 63 as a correction operational means. The acceleration increment X is added to the basic control amount BASE in the adder 63.

Moreover, when the acceleration condition is found, a signal S1 including acceleration increment Pup for increasing the preset supercharge pressure Pset is produced by the acceleration determining means 62 and is applied to an adder 64 and the increment Pup is added to the preset supercharge pressure Pset in the adder 64. Thus, a new set value P'set of the accelerated condition obtained, i.e., $P'set = Pset + Pup$ is produced as a signal S2. A subtracter 65 as a deviation operational means calculates the deviation $\Delta P$ between the actual supercharge pressure P2 and the new value P'set, that is $\Delta P = P'set - P2$.

However, when an acceleration condition is not detected, the values of both X and Pup are not added each other and the deviation becomes $\Delta P = Pset - P2$. A correction amount calculating portion 66 seeks a feedback correction amount Xfb in accordance with the deviation $\Delta P$ thus sought. An adder 67 as correction operational means adds the feedback correction amount Xfb to the basic control amount BASE. As a result, a signal S4 which is the addition of the X and Xfb to the basic control amount BASE is produced from the adder 63. In order to determine an operation zone only where the feedback control becomes possible, there is provided operation zone determining portion 68. More specifically, the actual supercharge pressure P2 is compared with a predetermined value P2fb (<Pset) of the supercharge pressure where the feedback control starts and the time point when the actual supercharge pressure P2 exceeds a predetermined value of P2fb is determined as the operation zone where a feedback control should be made. When the operation zone to carry out the feedback control is determined, switching means 69 is closed and the feedback correction amount Xfb is added thereto in the adder 67.

Figure 5:
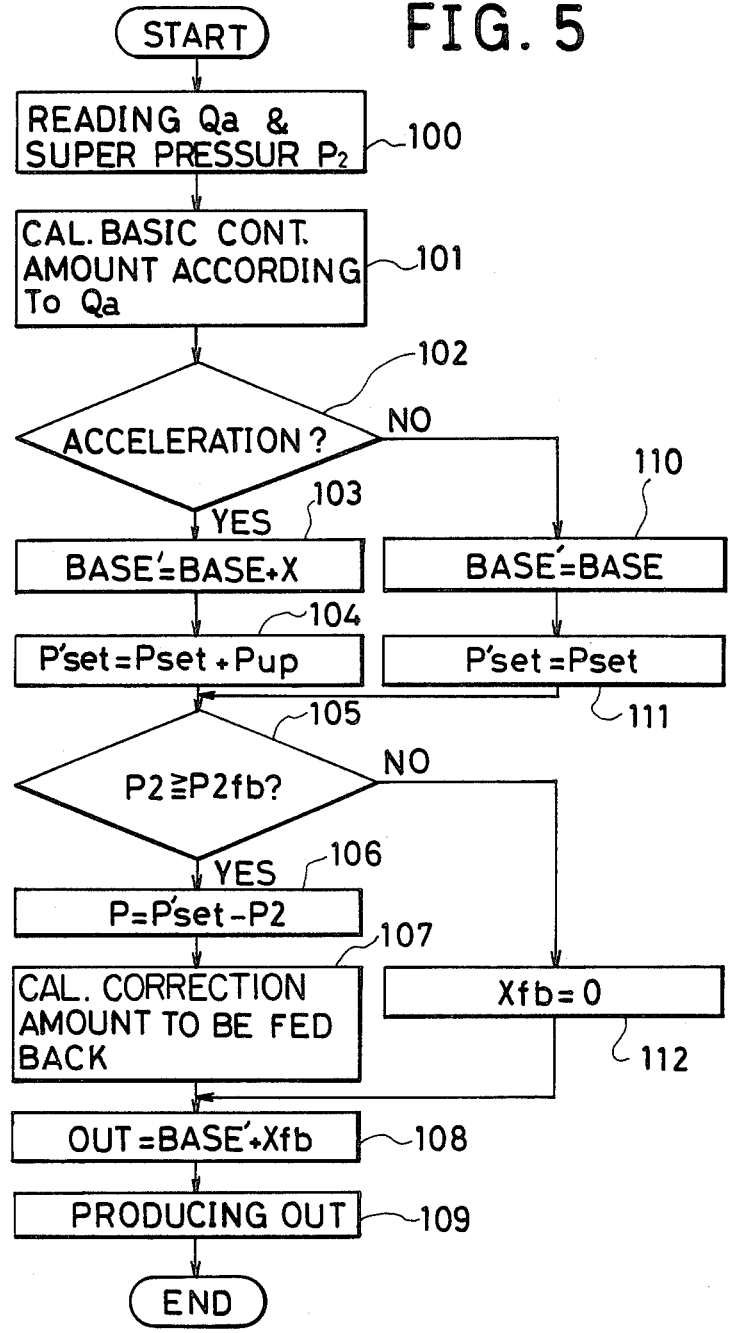
FIG. 5 illustrates a control flow chart of the method of controlling supercharge pressure, according to the present invention.

Now, operation of the apparatus for controlling supercharge pressure shown in FIGS. 1 through 3 according to the present invention will be explained with reference to the control flow chart shown in FIG. 5.

After starting the control, the intake air flow rate Qa detected by the air flow meter 31 and the supercharge pressure P2 detected by the supercharge pressure sensor 33 are read out in the step 100. Control then moves to the step 101 where the basic control amount BASE of the duty value of the electromagnetic valve 57 is determined in accordance with the intake air flow rate Qa by a table look-up operation relating to FIG. 4. After executing this step, the operation now moves to the step 102 where a decision or determination is made if acceleration is being carried out. If the result of the decision is YES, i.e., if there is an acceleration condition, the operation moves to the step 103 where a control amount $BASE' = BASE + X$ is calculated by adding the acceleration increment X to the normal basic control amount BASE and the operation moves to the step 104 where the preset supercharge pressure P'set is calculated by the addition of the preset supercharge pressure Pset and the acceleration increment Pup, i.e., $P'set + Pset + Pup$. After this operation, the operation now moves to the next step.

In the step 105, another decision is made if the actual supercharge pressure P2 is equal to or larger than P2fb by comparing P2 with P2fb. If the result of the decision is YES, i.e., $P2 \geq P2fb$ is established, the operation moves to the step 106 where deviation $\Delta P = P'set - P2$ is calculated and then the feedback correction amount Xfb is calculated in accordance with the deviation $\Delta P$ thus obtained in the step 107. After executing this step, the operation now moves to the step 108 where the final duty value $OUT = BASE' + Xfb$ is calculated by adding Xfb to the control amount $BASE' = BASE + X$ and a control signal having this duty value is produced in the step 109. The electromagnetic valve 57 is controlled by this control signal.

On the other hand, if the result of the decision in the step 102 is NO, that is, there is no acceleration, the operation moves to the steps 110 and 111 where no addition is made to the basic control amount BASE and to the value Pset, respectively, that is BASE' becomes equal to BASE while P'set also becomes equal to Pset.

Moreover, if the result of the decision is NO in the step 105, the operation moves to the step 112 where no calculation is made about the feedback correction amount Xfb, that is, Xfb becomes zero.

Figure 6:
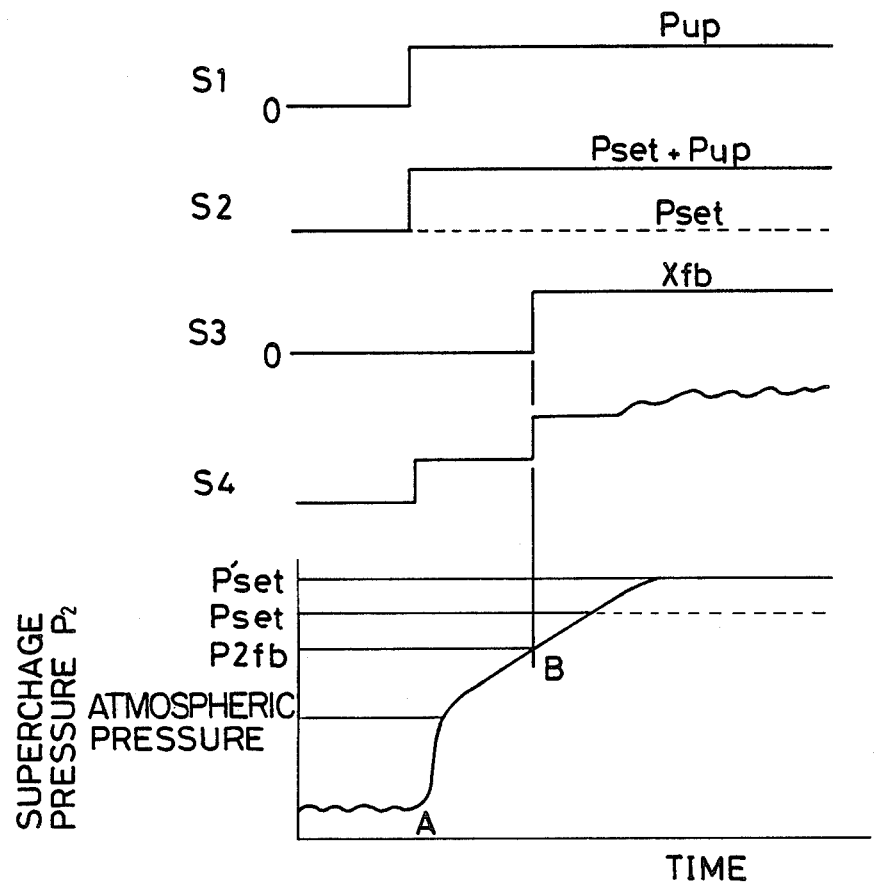
FIG. 6 illustrates an operation timing chart of output signals and supercharge pressure against the time elapsed for explaining the apparatus according to the present invention.

By way of example, actual operation of the engine will now be explained. In FIG. 6, signals $S_1$ to $S_4$ indicate the same signals as those indicated in FIG. 3, respectively. In the normal operation zone, the control signal $S_4$ is produced in accordance with the intake air flow rate Qa. The actual supercharge pressure P2 increases at the time point A when acceleration is performed. In this case, as the acceleration increment X is added to the basic control amount BASE, the actual supercharge pressure P2 increases rapidly and at the same time the target supercharge pressure is added to the value Pup, thereby increasing the target supercharge pressure.

The feedback control is started at the time point B when the actual supercharge pressure reaches a predetermined value P2fb and the actual supercharge pressure P2 is controlled to be equal to $P'set = Pset + Pup$. As a result, the actual supercharge pressure is maintained at the optimum target supercharge pressure in the accelerated condition so that even when any dispersion of parts of the engine or any charge in the engine with the time elapsed exists, the possibility of control errors produced therefrom can be cancelled thereby. Accordingly, lowering of acceleration performance and knocking phenomena due to the deviation of the actual supercharge pressure from the target supercharge pressure when accelerated, can be prevented.

Moreover, since control errors due to the variations in the parts can be cancelled, severe control of the assembling accuracy as well as parts accuracy can be dispensed with, thus suppressing the total costs of the system due to the reduction of inspection process.

Furthermore, in the feedback control, when an acceleration condition is determined, acceleration increments in the basic control amount BASE and in the target supercharge pressure Pset are to be increased respectively. In that case, it is preferable to perform the acceleration increment in the basic control amount BASE first and then to increase the value of Pset and not carry out those increments at the same time. The reason is as follows;

In the initial acceleration, the turbine rotation can not follow up the increase in the exhaust gas amount, so that the discharge pressure upstream of the turbine temporarily becomes high, with the turbine 37 acting as a resistance. On the other hand, since the exhaust bypass valve 40 is restricted in its position under a balanced condition between discharge pressure and the spring force of the spring 55 of the actuator 50, the discharge pressure tends to open the exhaust bypass valve 40 against the spring 55 due to the force of the discharge pressure on the exhaust bypass valve 40. As a result, the exhaust gas flow bypassing the turbine 37 tends to increase and the resulting increase in the rotations of the turbine is delayed, thus degrading the leading edge of the supercharge pressure.

In order to improve the leading edge of the supercharge pressure in the initial acceleration in question, only if the acceleration increment of the value of BASE is carried out earlier than the increase in the target supercharge pressure and the spring force of the spring 55 can be increased accordingly while decreasing the pressure exerting on the diaphragm 52 of the actuator, the exhaust bypass valve 40 no longer tends to be opened in the initial acceleration, thus obtaining a good respond in the initial acceleration.

As described in the foregoing embodiment according to the present invention, since the preset or target, supercharge pressure is increased as the result of an acceleration condition being determined and the supercharge pressure can be feedback-controlled to the target supercharge pressure in the acceleration condition in accordance with the detected supercharge pressure, any control errors brought about by variations in parts and/or a change in the engine with the time elapsed can be cancelled and good acceleration performance can be obtained while preventing the engine knocking phenomena from occurring.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A method for controlling supercharge pressure of a turbocharger which comprises the steps of:
    (a) seeking basic control amount BASE from a look-up table in accordance with an intake air flow rate Qa;
    (b) determining whether an acceleration condition is occurring;

(c) if an acceleration condition is determined, calculating a basic control amount BASE' by adding an acceleration increment X to the basic control amount BASE and calculating a target supercharge pressure P'set by adding an acceleration increment Pup to a preset supercharge pressure Pset, and if no acceleration condition is determined, calculating said basic control amount BASE' and said target supercharge pressure P'set without said acceleration increments;

(d) determining if an actual supercharge pressure P2 is equal to or greater than a predetermined pressure value P2fb;

(e) if the actual supercharge pressure P2 is equal to or greater than P2fb, calculating the deviation $\Delta P = P'set - P2$ between the target supercharge pressure P'set and the actual supercharge pressure P2, and calculating a correction amount Xfb to be fed back based on the deviation $\Delta P$, and if the actual supercharge pressure P2 is smaller than P2fb, setting the correction amount Xfb to zero;

(f) producing a duty value by adding the correction amount Xfb to the basic control amount BASE'; and (g) outputting a control signal based on said duty value to an electromagnetic valve for controlling the supercharge pressure.

2. A method for controlling supercharge pressure of a turbocharger as set forth in claim 1 wherein, when no acceleration is determined, the basic control amount BASE' is made equal to the basic control amount BASE and the target supercharge pressure P'set is made equal to the preset supercharge pressure Pset.

3. A method for controlling supercharge pressure of a turbocharger as set forth in claim 1 wherein the acceleration increment X is added to the basic control amount BASE before the acceleration increment Pup is added to the preset supercharge pressure Pset to improve response to the supercharge pressure during initial acceleration.

4. A method of controlling supercharge pressure for a turbocharger as set forth in claim 1 wherein said preset supercharge pressure Pset is 375 mmHg.

5. An apparatus for controlling supercharged pressure of a turbocharger comprising:

operational state detecting means for detecting operational conditions of an engine connected to said turbocharger;

basic control amount calculating means for calculating a basic control amount based on said detected operating conditions;

acceleration determining means for determining based on said detected operational conditions whether said engine is experiencing an acceleration condition;

acceleration increment calculating means for calculating an acceleration increment based on the output of said acceleration determining means in accordance with said basic control amount from said basic control amount calculating means;

target supercharge pressure setting means for setting a target supercharge pressure higher than a normal supercharge pressure when said acceleration determining means determines that said engine is operating in an acceleration condition;

deviation calculating means for calculating a deviation between the target supercharge pressure set by the target supercharge pressure setting means and an actual supercharge pressure detected by the operational state detecting means;

correction amount calculating means for calculating a correction amount of feedback control of the supercharge pressure based on the deviation calculated by the deviation calculating means;

control amount correction means for correcting the basic control amount from the basic control amount calculating means based on the correction amount from the correction amount calculating means; and control means for controlling exhaust gas flow of said engine based on the basic control amount corrected by the control amount correction means to perform feedback control of the supercharge pressure.

6. An apparatus for controlling supercharge pressure of a turbocharger as set forth in claim 5 wherein said operational state detecting means comprises a plurality of detecting devices for detecting the operation conditions of the engine including engine intake airflow rate and supercharge pressure, and said control means includes an exhaust bypass valve for discharging exhaust gas provided in an exhaust manifold of the engine and coupled to an actuator for controlling actuation of the bypass valve, and an electromagnetic valve for controlling said actuator in accordance with said basic control amount.

7. An apparatus for controlling supercharge pressure of a turbocharger as claimed in claim 6 wherein a lookup table relating to the basic control amount of the intake air flow rate is stored in the basic control amount calculating means.

* * * * *